US006640216B1

(12) United States Patent
Loofbourrow et al.

(10) Patent No.: US 6,640,216 B1
(45) Date of Patent: Oct. 28, 2003

(54) HUMAN RESOURCE KNOWLEDGE MODELING AND DELIVERY SYSTEM

(75) Inventors: Tod Hayes Loofbourrow, Boston, MA (US); Steve Herbst, Carlisle, MA (US); Timothy S. Farlow, Needham, MA (US)

(73) Assignee: Authoria, Inc., Waltham, MA (US)

( * ) Notice: Subject to any disclaimer, the term of this patent is extended or adjusted under 35 U.S.C. 154(b) by 0 days.

(21) Appl. No.: 10/307,859

(22) Filed: Dec. 2, 2002

Related U.S. Application Data

(63) Continuation of application No. 09/244,451, filed on Feb. 4, 1999, now Pat. No. 6,505,183.

(51) Int. Cl.[7] .......................... G06F 17/00; G06F 15/18
(52) U.S. Cl. ................................ 706/45; 706/1; 706/9; 706/46
(58) Field of Search ............................. 706/45, 1, 9, 46

(56) References Cited

U.S. PATENT DOCUMENTS

| | | | |
|---|---|---|---|
| 6,029,144 A | 2/2000 | Barrett et al. | |
| 6,061,506 A | 5/2000 | Wollaston et al. | |
| 6,226,792 B1 * | 5/2001 | Goiffon | 717/11 |

OTHER PUBLICATIONS

"Price Waterhouse And Foundation Technologies Launch Global Alliance In Human Resource Consulting And Software Areas," *Press Release*, Thomas Clohesy, TMC Communications, LLC, New York, NY, (Feb. 5, 1998).

"$8.5 Million in Funding Affirms Foundation Technologies As The Market Leader in Knowledgebase Software For Human Resources," *Press Release*, Duffey Communications, Inc., Boston, MA, (Mar. 10, 1998).

"Employease and Foundation Technologies Partner to Co–market Services Employease also integrates Foundation Technologies' Products Into Call Center and Employee Self Service," *Press Release*, Bob Wice/Michael Neumeier, Duffy Communications, Inc., Atlanta, GA (May 12, 1998).

"iExpert Sold to Private Investors; Roger J. Leigh is Named President and CEO," *Press Release*, Norwalk, CT (Jul. 1, 1998), retrieved from the Internet <http://www.proacttechnologies.com>.

"Inference and Foundation Technologies Partner to Provide HR Search Capability," *Business Wire*, (Sep. 16, 1997).

"iExpert Announces the Release of iExpert™ Version 1.1.7," *Press Release*, Stamford, CT (Dec. 11, 1998), retrieved from the Internet <http://www.proacttechnologies.com>.

* cited by examiner

*Primary Examiner*—George B. Davis
(74) *Attorney, Agent, or Firm*—Hamilton, Brook, Smith & Reynolds, P.C.

(57) ABSTRACT

A knowledge modeling and delivery system combines pre-configured, parameterized models of human resource knowledge with organization-specific and employee-specific data. It delivers personalized answers to employee and manager questions about benefit plans, payroll, human resource (HR) policies, procedures, and practices. The pre-configured, parameterized models can be created and maintained outside the organization, the organizational data are created and maintained by the organization, and personal data are accessed or read from existing human resource management systems (HRMS's). This threefold partitioning yields a system that can be quickly customized to an individual organization, yields detailed and accurate information for individuals within the organization, and can be maintained in a cost-effective manner.

23 Claims, 5 Drawing Sheets

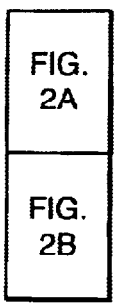

FIG. 2

Health and welfare 101

| Chapter | Section | Topic |
|---|---|---|
| Eligibility | Dependent adopted child | Can I cover adopted child? |
| | Age limits | How long can I cover my child? |
| | Child in military 122 | Can I cover my child who is in the military? |
| 120 | | • • • • |
| | Employee eligibility rules 122 | Am I eligible to participate in plan? 124 |
| | Waiting periods | What are the general rules? 124 |
| Benefits | Amount of benefits | How much of my claim will the plan pay? 124 |
| • • • • • | • • • • | • • • • |

Defined Contribution retirement plans

| Chapter | Section | Topic |
|---------|---------|-------|
| • | • | • |
| • | • | • |
| • | • | • |
| • | • | • |
| • | • | • |

Defined benefit plans

| Chapter | Section | Topic |
|---------|---------|-------|
| • | • | • |
| • | • | • |
| • | • | • |
| • | • | • |
| • | • | • |

Compensation

| Chapter | Section | Topic |
|---------|---------|-------|
| • | • | • |
| • | • | • |
| • | • | • |
| • | • | • |
| • | • | • |

Benefits

| Chapter | Section | Topic |
|---------|---------|-------|
| • | • | • |
| • | • | • |
| • | • | • |
| • | • | • |
| • | • | • |

FIG. 2B

201 TOPIC HEADING

203 VARIABLE POPULATED FROM ORGANIZATION INFORMATION

204 VARIABLE POPULATED FROM HRMS INFORMATION

205 REFERENCE TO ANOTHER TOPIC

124

HEADING What is the maximum amount I can contribute to my spending account?

202 RULE:
IF Combined_maximum_contribution_for_FSH_and_FSD EQUALS yes
THEN The maximum contribution you can make to your Plan_name_for_FSH is Maximum_annual_combined_employee_contribution_amount per year combined with your JUMP dependent care flexible spending >> FSH10A07 ENDJUMP account.
ELSE The maximum contribution you can make to your Plan_name_for_FSH is Maximum_annual_employee_contribution_amount_for_FSH per year.
ENDIF

IF Hcfs_election DOES NOT EQUAL na
THEN You have elected to contribute $ Hcfs_cost per month to your account.
ENDIF

See also: JUMP Minimum contribution >> FSH03C02 ENDJUMP

FIG. 3

Organizational Information Repository (103)

| Value | Variable name | Plan name | Effective date | Ending date |
|---|---|---|---|---|
| 19 | Med_elig_age | HMO Blue | 1/1/1990 | 12/31/1999 |
| 21 | Med_elig_age | HMO Blue | 1/1/2000 | |
| 18 | Med_elig_age | Harvard-Pilgrim | 1/1/1990 | |
| 432.50 | Combined_maximum_contribution_for_FSH_and_FSD | Plan XY | 5/1/1995 | |
| ..... | ..... | ..... | ..... | ..... |

HUMAN RESOURCE KNOWLEDGE MODELING AND DELIVERY SYSTEM

RELATED APPLICATION

This application is a continuation of U.S. application Ser. No. 09/244,451, filed Feb. 4, 1999, U.S. Pat. No. 6,505,183. The entire teachings of the above application are incorporated herein by reference.

BACKGROUND OF THE INVENTION

Human Resource (HR) departments today use many systems for answering employee and manager questions about benefit plans and HR policies, procedures, and practices. These questions include how to: use medical plans, take leaves of absence, and file harassment complaints, as well as other questions regarding paycheck amounts, for example.

The information sources used to address the questions in the typical organization usually reside in various formal and informal repositories. Some sources are static documents, both paper and electronic. These documents may or may not have been generated by the department to answer questions posed by employees. Other information sources include the human resource management systems (HRMS's), which are repositories for accounting information for each employee. Finally, some information lives only in the heads of the experienced HR professionals in the organization. These various and unconnected systems are the basis of most companies' HR information dissemination processes today, but there are problems with the underlying model for information dissemination.

Pre-prepared, static documents, such as policy manuals, summary plan descriptions, and manually maintained web sites, are costly to produce. Further, they tend to become dated quickly, especially during major reorganizations. Also, these systems often only give generalized answers, because many of the detailed answers change depending on the particular employee's situation—employee group, physical location, age, and length of employment, for example.

HRMS's, which are sometimes part of even larger enterprise resource planning systems (ERP's), contain vast quantities of accurate, constantly-updated data. These systems, however, do not contain information on HR policies or on how to submit forms, for example. They tend to be able to answer very specific questions (e.g., what is the net amount on my monthly paycheck), but not general ones (e.g., I'm having a baby, what does the company do for me and what must I do to use these benefits).

Electronic repositories, containing answers to questions previously asked by other employees, are easy to search, but consume resources to prepare and still share the problems of prepared documents. They are also more likely to give wrong answers after changes in policies or organization, since it is hard to find and correct all of the affected answers, and even harder to verify that the changes are correct and complete.

HR professionals themselves can be used to answer questions. This resource, however, is expensive, and finding the right person to answer a question can be a frustrating and slow process for getting the responses. Also, using HR professionals to constantly answer repetitive questions, instead of working on more strategic initiatives, is not the best application of their skills.

Knowledge-bases have grown out of artificial intelligence work of the past three decades. The systems are designed to capture knowledge from subject matter experts, and then deliver that knowledge to non-expert individuals and applications. Many knowledge-base tools have been developed in academia and industry. The resulting knowledge-bases fall into two major categories: application-specific knowledge-bases, and general-purpose knowledge-base tools.

Application-specific knowledge-bases contain pre-configured information, which is ready for immediate use. The producers of these knowledge-bases build systems on various knowledge modeling and delivery technologies, and use subject-matter experts to fill these knowledge-bases with the information needed to address a particular problem set. Any person or organization that has problems covered by the knowledge-base will find the knowledge-base useful. If, however, the pre-configured information in the knowledge-base does not fully cover the problem set of the user, the utility of the knowledge-base is compromised. Also, as the problem set of the user changes over time, the provider of the knowledge-base must update the knowledge-base. Generally, knowledge-bases of this type are commercially successful only when the knowledge they contain is appropriate for multiple users, and the rate of change in the knowledge is slow over time.

General-purpose knowledge-base tools similarly are built on knowledge modeling and delivery technologies, but have no pre-configured information. A person or organization can take the general-purpose tools, learn the knowledge modeling methodologies appropriate to the tools, and then add information, acting as the subject matter expert. All maintenance of the knowledge through time is the responsibility of the user. Knowledge-base systems of this type are commercially successful when there are multiple users willing to populate and maintain their own individual knowledge-bases.

Knowledge-bases have not been widely successful to date because many users: 1) have problems that are unique in enough aspects to make pre-configured knowledge-bases impracticable, and 2) are unwilling to make the effort to learn knowledge modeling methodologies and then build and maintain knowledge using a general-purpose tool.

SUMMARY OF THE INVENTION

HR departments with their need to deliver information about benefit plans, policies, procedures, and practices exemplify problems confronting deployment of knowledge-based systems. While all companies have the underlying information and the information has much in common across companies, the details of the information varies enough from company-to-company such that pre-configured knowledge-bases are rejected by most companies. On the other hand, HR departments do not want to learn knowledge modeling tools and methodologies and to then build all of the complex models themselves, especially with the large amount of information needed to be managed and the high rate of change that is endemic to this information.

The present invention solves these problems by providing a knowledge modeling and delivery system that combines pre-configured, parameterized models of human resource knowledge with organization-specific and employee-specific data. The invention in its current implementation delivers personalized answers to employee and manager questions about benefit plans, payroll, HR policies, procedures, and practices.

The pre-configured, parameterized models can be created and maintained outside the organization with the organizational data being created and maintained by the organization. Then personal data are accessed or read from existing HRMS's. This threefold partitioning yields a system that can be quickly customized to an individual organization, yields detailed and accurate information for individuals within the organization, and can be maintained in a cost-effective manner.

In general, according to one aspect, the invention features a knowledge-based human resource information dissemination system. This system comprises an organization-specific information repository and an employee-specific information repository. An engine or compiler uses a knowledge model to respond to user queries by combining the information from the organization-specific repository and the employee-specific repository. In this way, in a typical implementation, the existing HRMS's can be used to provide detailed, relevant responses to queries while capitalizing on a generalized/formatted system that can be deployed across different organizations using similar knowledge model and engines.

Depending on the implementation, the compiler may use a variety of standard expert system inferencing techniques.

In the preferred embodiment, an information server is used to receive the user queries by a user-operated browser. The query is transferred to the engine and a response is generated, which is sent to the browser. Typically, the information server will use a hyper-text transfer protocol-based system.

The current embodiment uses a knowledge model comprising hierarchically-organized responses to expected queries. The responses have embedded parameters or variables. The embedded parameters are established by reference to information contained in the organization-specific information repository and the employee-specific information repository.

A knowledge modeling application is used to facilitate the generation of the knowledge model. An information collection application is used to prompt human resource managers in the organization to enter data relevant to the variable assignments of the organization-specific information repository.

Further, in the typical implementation, the employee-specific information repository comprises a human resource management system. The HRMS is extrinsic, i.e., from another vendor such as Peoplesoft and SAP, and may have a propriety interface. This incompatibility is solved by implementing a bridge that maps the variables contained in the knowledge model to the employee-specific information repository, for DDMS on which the HRMS is based. This allows the system to access, for example, on a read-only basis, the relevant employee-specific information. Although, in other embodiments, existing application program interfaces (API's) for the extrinsic HRMS system could be employed to read data.

In general, according to another aspect, the invention features a method for answering queries regarding employees. The method comprises collecting organization-specific data in an organization information repository typically at implementation time, for example. At response time, responses are generated to queries by reference to a knowledge model. An employee information repository is accessed to define employee-specific parameters, and the organization-specific repository is accessed to define organization-specific parameters. The generated response is then transferred as answers to the queries.

Aspects of the invention, however, have applicability outside of HR. For example, in general, according to another aspect, the invention also features a knowledge-base information system. This system comprises an organization-specific information repository, which holds general information common to multiple entities, and an individual-specific information repository, which holds information that is specific to the subject-entities. An engine uses a knowledge model to synthesize information from the organization-specific repository and the individual-specific repository and provide compiles responses to a user.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings:

FIGS. 2, 2A and 2B are tables showing the hierarchal organization of the knowledge model repository according to the present invention;

FIG. 3 illustrates the code for a parameterized rule of the knowledge model repository according to the present invention;

DETAILED DESCRIPTION OF THE PREFERRED EMBODIMENTS

Figure 1:
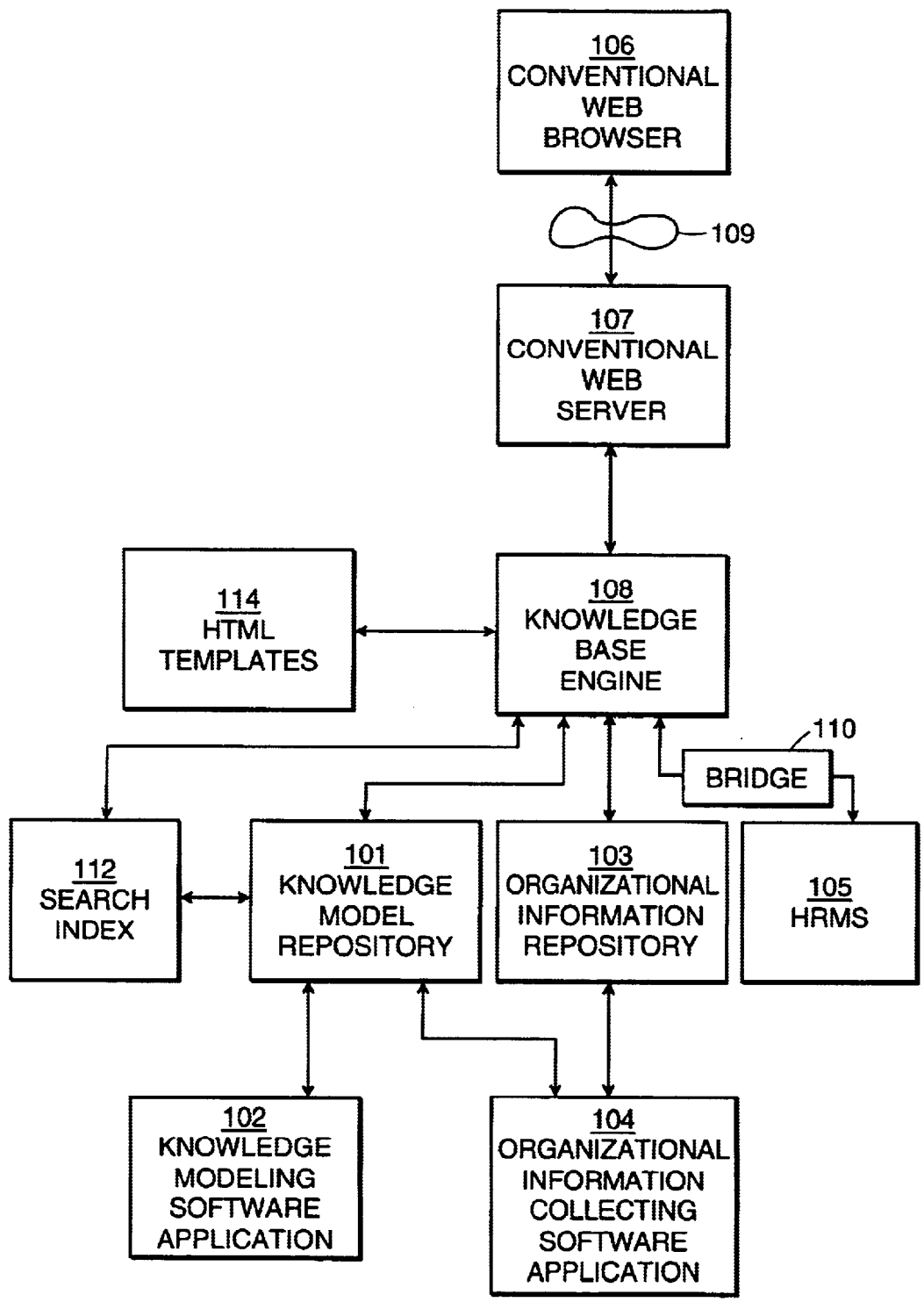
FIG. 1 is a block diagram showing the organization of a knowledge-based employee information system according to the present invention.

Turning now to the drawings, FIG. 1 shows a knowledge-based employee information system, which has been constructed according to the principles of the present invention.

In the preferred embodiment, the information is sent to the individual making the query using a combination of a conventional browser 106 and a conventional web server 107. In such an example, the server 107 and browser 106 communicate via a TCP/IP network 109. Such a system has certain advantages in that established platforms are readily available and operation is relatively simple. In other implementations, however, propriety interfaces could be used over public and/or private networks.

In anticipated applications, the individual is an employee seeking to answer its own question, or a manager seeking to answer questions regarding other employees, concerning benefits, for example. Alternatively, this system is also deployable to answer queries generated by HR professionals, who then interface with the employees seeking the information in a call-center environment, for example. In still other applications, the system is invoked during a plan selection process by an employee for example, to provide information to assist the employee with the decision.

A knowledge engine or compiler 108 dynamically generates the HTML (Hyper-Text Markup Language) pages that are provided by the web server 107. These web pages are generated by referencing the relevant section of the knowledge model repository 101 and inserting information from the organization-specific information repository 103 and human resource management system 105 functioning as the employee-specific information repository.

In the preferred embodiment, the compiled information from the knowledge model repository 101, organization-specific information repository 103, and the human resource management system 105 is then inserted into HTML template pages 114. The resulting complete pages are provided by the web server 107. The use of template pages allows the easy customization of the "look-and-feel" of the system relative to the user by the inclusion of graphics, for example, generated by the organization.

In other embodiments, the responses are interfaced with other applications and or processes rather than directly with users. For example, information can be transferred to a case management or claims processing system.

The knowledge model repository 101 contains the knowledge models. In the preferred embodiment, these models are implemented either in an object-oriented or relational database system.

Presently, the knowledge model repository typically contains multiple plans, such as benefit plans for hourly-workers and other plans for salaried workers. The model for each of these plans, however, is hierarchically-organized. A three-tiered organization is implemented with chapters at the highest level, sections at the middle level, and topics at the lowest level. Exemplary models are health and welfare, defined contribution, defined benefits, compensation, time-off, employee services, employment, business expenses, employee relations, and payroll. In the preferred embodiment, these chapters are separate, independent modules.

The knowledge modeling software application 102 is a tool that is used to generate the knowledge model repository 101. This system tracks variable assignments and their location in the organizational and HRMS repository. It also provides template rule organization tools for drafting the topics.

As illustrated in FIG. 2, in the eligibility chapter 120 of the knowledge model repository 101, there are various sections 122 such as dependant adopted child, age limits, child in the military, employee eligibility rules, and waiting periods. One topic 124 under dependant adopted child is—can such a child be covered?. Under age limits section, the topic is—how long can I cover my child. In the section of child in the military, the topic is—can such a child be covered.

The current hierarchal organization leads to specific techniques for the generation of queries. Currently, text-embedded links displayed at the user's browser 106 are followed by the users to successfully walk through the tables to obtain the answer required. Additionally, a search index 112 is also generated to allow for key-word or natural-language type searching.

FIG. 3 shows the Rule 202 contained in a specific topic 124. The topic 124 has a topic heading 201, which is the question that is related to the topic. In this case, it is "What is the maximum amount I can contribute to my spending account?". The parameterized Rule 202 has embedded variables such as combined_maximum_−contribution_for_FSH_and_FSD. If this boolean variable equals yes, then the following text is transferred by the knowledge-base engine 108 to the web server 107 to dynamically generate the HTML page: "The maximum contribution you can make to your . . . is . . . per year combined with your . . . " In this case, plan_name_for_FSH and maximum_annual_combined_employee_contribution_amount are variables that are populated from the organization-specific information repository 103 and HRMS 105. The variable for the elected contribution per month for the employee's account, Hcfs_cost, is populated from the HRMS repository 105.

Although the preferred embodiment uses a rules and text implementation of the knowledge model repository 101, other inferencing mechanisms are possible such as case-based reasoning, and neural network-based systems, for example.

In the preferred embodiment, variable prompts are also stored with the rules in the knowledge model repository 101. These prompts are the questions that are asked of or posed to the HR professionals to obtain the information needed to declare the values of the associated variables. These prompts are used at implementation-time as the mechanism for interrogating the HR professionals to obtain the organization-specific information in the organizational information repository 103.

Figures 4, 5:
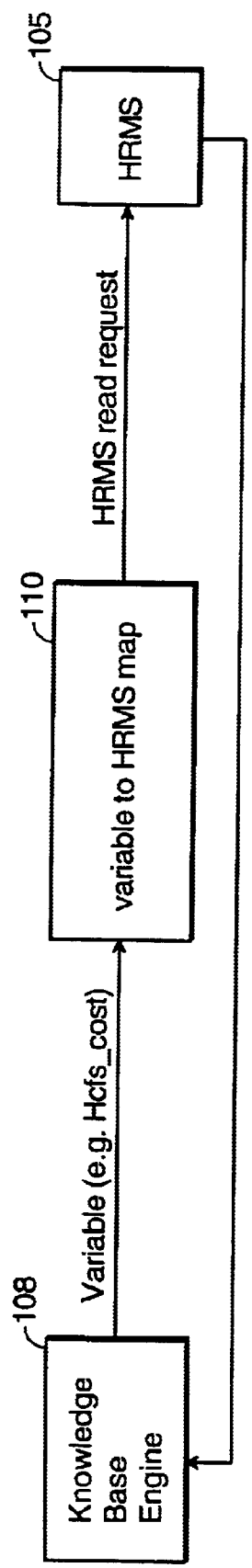
FIG. 4 shows the variable assignments in the organization-specific information repository.
FIG. 5 shows the system for accessing employee-specific information repository in the HRMS.

FIG. 4 illustrates the contents of the organization-specific information repository 103. This is a look-up table or relational database of variable values or assignments, which are indexed by the variable name, benefit plan (plan name), effective date, and ending date. For example, the variable Med_elig_age is assigned different values based on the plan, end and effective dates. A blank or empty ending date indicates relevancy for an indefinite time period, i.e., no end date.

Additionally, situations exist where the organizational information repository 103 contains additional information, such as general plan and policy information and information concerning employee groups, such as salaried and hourly workers, i.e., information that is applicable subsets of employees within the organization. Plans and policies can also be associated with specific employee groups.

In alternative embodiments, object oriented-type database systems are used. The advantage of such system is that additional logic operations are executed to create the variable assignments. For example, the variable assignments could be based upon equations referring to other variables or criteria-based assignments.

Returning to FIG. 1, the organizational information collection software application 104 is used as a tool for the HR system managers at the organization as an aid to accumulating the necessary information in the organization-specific information repository 103. In the current embodiment, this collection tool asks the system managers to successively enter the information required by the system. The questions are generated by accessing the associated variable prompts, which are stored in the knowledge model repository 101.

In the current embodiment, the system intelligently propagates the information as it is entered by the collection tools 104 so that the same information need not be entered repetitively. For example, if the combined_maximum_contribution_−for_FSH_and_FSD variable value is the same regardless of the effective date and for salaried and hourly employees, the information is entered only once, but then propagated by the tool to the various locations in the repository 103.

Further, the tool preferably also has capability to propagate the entered information between benefit plans, for example. Consider a situation in which different medical plans are provided to different classes of workers. For example, one plan is provided for hourly-workers and another plan is provided for salaried-workers, within a given organization or institution. Although there will be differences between the two plans, there is substantial amounts of common information, such as variables associated with the company name, plan names, healthcare provider organizations, for example. The information collection software application 104 propagates information entered in response to a prompt in instantiated plans within the system. Moreover, the prompts are hierarchically organized in the knowledge model repository 101 in the same manner as that illustrated in FIG. 2. This organization dictates the order in which the prompts are posed to the HR system managers during the initial implementation and configuration.

Additionally, variable values can be derived or calculated using additional inferencing capabilities, based on data from the HRMS or other information.

FIG. 5 illustrates the interaction between the knowledge base engine 108 and the HRMS 105. Specifically, the knowledge-base engine 108 accesses the HRMS 105 via the HRMS bridge 110. This bridge is necessary since in the anticipated implementation, the HRMS system is an extrinsic database and program, from another vendor. For example, it can a system by Peoplesoft or SAP. In the preferred embodiment, the knowledge based engine 108 issues a request for a variable value, for example, Hcfs_ cost. The requested variable is provided to the bridge 110, which has a variable-to-HRMS map. This map essentially describes where in the extrinsic HRMS 105 the information exists. This map then generates a compatible read request to HRMS 105, which then issues the variable information typically directly to the knowledge based engine 108.

Additionally, bridges can be created to other extrinsic data sources such as call tracking system and vendor transaction control systems. Additionally, information can be pulled from medical plan providers concerning physicians, for example along with 401 k providers, such as current balance.

Currently, there are two contemplated and implemented techniques for performing this mapping. First, native application program interfaces (API's) for the extrinsic database and program can be used to get the information required for the requested variable. In this implementation, the map is a cross-reference between variables and the API-call that is required to get the variable value out of the extrinsic HRMS system 105. In the alternative implementation, where the HRMS system uses relational databases for example, the bridge contains a reference for each system to the location in the extrinsic vendor relational database where the information required for the variable resides, such as, for example, table xx, column yy.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A knowledge-based human resource information dissemination system, comprising:
   a human resources knowledge model, the knowledge model comprising responses to expected queries, the responses having embedded parameters;
   an organization-specific information repository containing values for parameters of the human resources knowledge model;
   an employee-specific information repository containing values for parameters of the human resources knowledge model;
   a compiler that uses the human resources knowledge model to combine information from the organization-specific information repository and the employee-specific information repository to deliver personalized human resources information concerning a specific employee in response to user queries; and
   a bridge that enables the compiler to access information in the employee-specific information repository.

2. A knowledge-based system as described in claim 1, further comprising information server that receives the user queries via a user-operated browser and that transfers responses generated by the synthesis engine to the browser.

3. A knowledge-based system as described in claim 2, wherein the information servers uses a hyper-text transfer protocol with the user-operated browser.

4. A knowledge-based system as described in claim 1, wherein the embedded parameters are established by reference to information contained in the organization-specific information repository and the employee-specific information repository.

5. A knowledge-based system as described in claim 1, further comprising knowledge modeling application that facilitates the generation of the knowledge model.

6. A knowledge-based system as described in claim 1, wherein the organization-specific information repository comprises variable assignments related for parameters contained in the knowledge model.

7. A knowledge-based system as described in claim 6, further comprising an information collection application that prompts system managers for the organization to enter data relevant to the variable assignments of the organization-specific information repository.

8. A knowledge-based system as described in claim 1, wherein the employee-specific information repository comprises variable assignments related for parameters contained in the knowledge model.

9. A knowledge-based system as described in claim 1, further wherein the bridge maps variables contained in the knowledge model employee-specific information repository based on an extrinsic human-resource management system.

10. A knowledge-based system as described in claim 1, the personalized information comprising a benefit plan.

11. A knowledge-based system as described in claim 1, the personalized information comprising payroll information.

12. A knowledge-based system as described in claim 1, the personalized information comprising any of human resource policies, procedures and practices.

13. A method of answering human resource queries regarding employees, the method comprising:
   collecting organization-specific data in an organization information repository;
   generating personalized responses to human resources queries, each response concerning a particular employee, based on a human resources knowledge model containing parameters for the organization-specific data and employee-specific data, the knowledge model comprising responses to expected queries with embedded parameters;
   accessing an employee information repository, using a bridge, to obtain the employee-specific data;
   accessing the organization-specific repository to obtain the organization-specific data;

compiling the knowledge model by substituting the obtained employee-specific data and organization-specific data for knowledge model parameters to generate the responses to the human resources queries; and transferring the generated responses as answers to the human resources queries.

14. A method described in claim 13, each personalized response comprising a benefit plan.

15. A method as described in claim 13, wherein the step of transferring the generated responses comprises serving the responses to a user-operated browser.

16. A method as described in claim 15, wherein serving the responses comprises a hyper-text transfer protocol.

17. A method as described in claim 13, wherein the step of compiling the organization-specific data comprises collecting information by prompting system managers for the organization to enter data relevant to the parameters.

18. A method as described in claim 13, wherein the step of accessing the employee-specific information repository comprises referring to a map that relates the employee-specific parameters to data contained in an extrinsic human-resource management system.

19. A method described in claim 13, each personalized response comprising payroll information.

20. A method described in claim 13, each personalized response comprising any of human resource policies, procedures and practices.

21. A knowledge-based employee information system, comprising:

means for modeling responses to employee-related queries, the modeled responses having embedded parameters;

means for storing organization-specific information, the organization-specific information comprising values for parameters of said modeling means;

means for storing employee-specific information, the employee-specific information comprising values for parameters of said modeling means;

means for responding to user queries by combining information from the organization-specific information storage means and the employee-specific information storage means using modeled responses, each response being personalized for a specific employee; and bridge means for enabling the compiler to access information in the individual-specific information repository.

22. A knowledge-based information system, comprising:

a human resources knowledge model comprising responses to expected queries, the responses having embedded parameters;

an organization-specific information repository containing values for parameters of the human resources knowledge model;

an individual-specific information repository containing values for parameters of the human resources knowledge model; and a compiler that uses the human resources knowledge model to combine information from the organization-specific information repository and the individual-specific information repository to provide personalized information concerning a specific individual to a user and/or other process; and a bridge that enables the compiler to access information in the individual-specific information repository.

23. A method of disseminating information, the method comprising:

collecting organization-specific data in an organization information repository;

generating compiled information offerings by reference to a human resources knowledge model containing parameters for the organization-specific data and individual-specific data;

accessing, via a bridge, an individual information repository to obtain the individual-specific data; accessing the organization-specific repository to obtain the organization-specific data; and transferring the compiled information offerings to users, the compiled information being personalized for specific individuals.

* * * * *